Aug. 16, 1966    AKIRA SAITO    3,266,784
DEHUMIDIFIER OF AIR

Filed Feb. 19, 1964    2 Sheets-Sheet 1

Akira Saito
INVENTOR.

BY George B. Anjirolk
Attorney

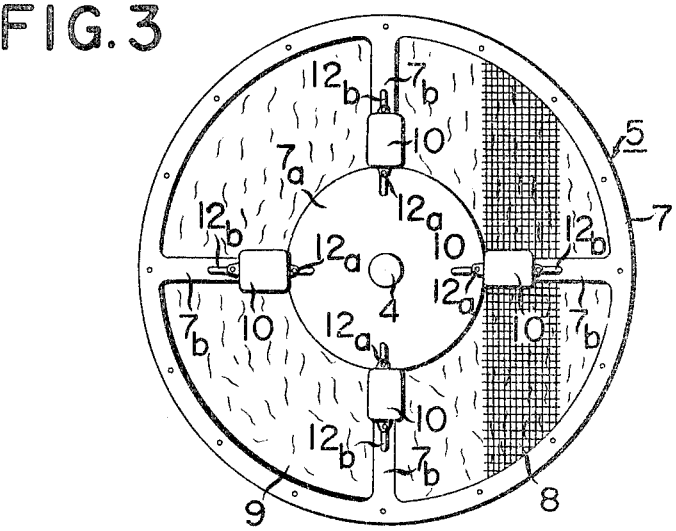
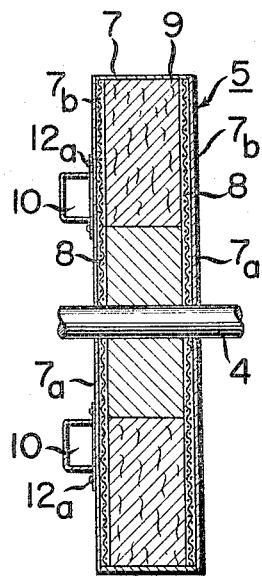
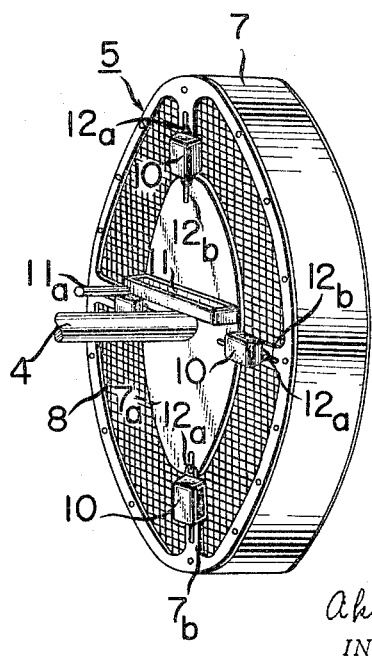

United States Patent Office 3,266,784
Patented August 16, 1966

3,266,784
DEHUMIDIFIER OF AIR
Akira Saito, 406 2-chome, Wakamiya-cho,
Ichikawa-shi, Chiba-ken, Japan
Filed Feb. 19, 1964, Ser. No. 346,005
Claims priority, application Japan, Mar. 2, 1963,
38/10,027
4 Claims. (Cl. 261—3)

The present invention relates to a dehumidifier of air and more particularly to an improved dehumidifier wherein a liquid absorbent is circulated through an absorbent tower and a regeneration tower.

In dehumidifiers of the prior art, a liquid absorbent contained in the bottom portion of an absorbing tower is fed to the top of an absorbing tower by means of a pump and is then sprayed down from nozzles provided at the top so as to cause particles of the liquid absorbent to come into intimate contact with air in the absorbing tower so to absorb the moisture in the air. The liquid absorbent which has been diluted by absorbing the moisture is pumped to a concentrating tower to remove the moisture thus regenerating the liquid absorbent.

It is an object of this invention to provide an economic dehumidifier that can operate at least at the same or higher efficiency than the dehumidifier of the type referred to above.

It is another object of this invention to provide an improved humidifier which does not require the use of a pump.

According to this invention, while an absorption tower and a regeneration tower are used like the prior dehumidifier, rotary wheels and buckets are substituted for pumps and spraying means in order to circulate the liquid absorbent through these towers.

Briefly stated, according to one feature of this invention a rotary drum is provided in each of the absorption and regeneration towers. This drum contains porous packing or scrap material which has high heat capacity and conductivity so that the contact area between the humid air and the liquid absorbent is increased. The temperature of the air is elevated due to absorption heat caused by absorbing the moisture. However, since the packing or scrap materials have high heat capacity and cool the air, the temperature rise is very slight.

According to the other feature of this invention buckets are mounted on a rotary drum disposed in the absorption chamber to feed diluted liquid absorbent into the regeneration or evaporation tower and an overflow pipe is provided between the two towers to return the concentrated liquid in the regeneration tower back into the absorption tower. This arrangement obviates the necessity of using pumps to circulate liquid absorbent between the two towers.

The features of the invention which are believed to be novel are set forth with particularity in the appended claims. The invention and further objects and advantages thereof, may best be understood by reference to the following description taken in connection with the accompanying drawings, in which:

FIG. 3 is a side view of a rotary drum disposed in the absorption tower;

FIG. 4 is a longitudinal sectional view of the rotary drum, and

FIG. 5 is a perspective view illustrating the relation of the rotary wheel, buckets, chute, etc.

Figure 1:
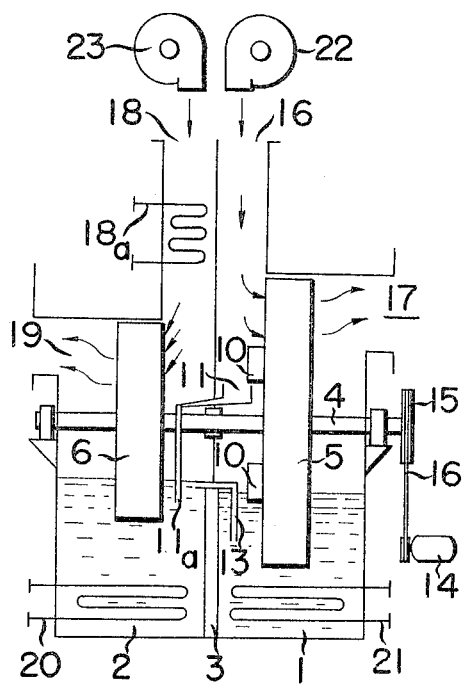
FIG. 1 is a schematic sectional view of one embodiment of this invention.

Referring now to the accompanying drawings which illustrate a preferred embodiment of this invention, an absorbing tower 1 and a regeneration tower 2 partitioned by a partition wall 3 are disposed side by side, the bottoms thereof being in the form of tanks to accommodate a suitable liquid absorbent such as lithium chloride. Extending through the absorbing tower and the regeneration tower is a horizontal rotary shaft 4 to support a pair of rotary drums 5 and 6 in the absorbing tower and the regeneration tower respectively. Each rotary drum comprises an outer annular frame 7 and wire nets 8 closing both end surfaces of the frame and contains a scrap material 9. On each side of the rotary drum, a plurality of arms, e.g., four, arms 7b are provided to extend radially from a boss 7a which supports the shaft 4 to prevent the wire net 8 from bulging outwardly with the scrap material 9. FIGS. 3 to 5 show the rotary drum 5 disposed in the absorbing tower. A plurality of buckets 10, opened in the direction of rotation are secured to one side of the rotary drum 5. The loci of movements of these buckets are determined by the distance thereof from the rotary shaft 4. When the level of the liquid absorbent in the absorbing device is at a line P, shown in FIG. 2, the quantity of liquid of a bucket, designated by a reference numeral 10a is smaller than that of a bucket, designated by 10b, when the liquid level is at a line P'. In order to avoid this, or to make the quantities of liquid at levels P and P' equal, the bucket may be shifted outwardly to a position indicated by 10c. In this case, the bucket trough 11 is shifted to a position indicated by dotted lines so as to positively receive the liquid discharged from the bucket 10c. The trough should be located near the side surface of the rotary drum 5 but in a position not to interfere with the rotation of buckets.

As shown in FIG. 5 trough 11 has a pipe 11a extending through and supported by partition wall 3 to feed the liquid absorbent to the regeneration tower 2. Adjustments of the buckets 10 is made possible by elongated slots 12b through arms 7b and bolts 12a passing therethrough.

Referring again to FIG. 1 an overflow pipe 13 is connected near the liquid level of the regeneration tower 2, so that when the level of the liquid absorbent in the regeneration tower rises above a predetermined level, the liquid returns to the absorbing tower through the overflow pipe. The lower portions of the rotary drums 5 and 6 are normally immersed in the liquid absorbent so that as the shaft 4 is rotated by an electric motor 14 gear wheel 15 and chain 16 the scrap material in the rotary drums 5 and 6 is wetted by the liquid. An inlet port 16 for the air to be dehumidified is at the top of the absorbing tower 1 at one side of rotary drum 5 which serves to partition the device into two sections and an outlet port 17 for the dehumidified air is on the opposite side. Similarly, an inlet port 18 for introducing air into the regeneration tower 2 is connected to one side of rotary drum 6 and a heater 18a is provided in inlet 18. Air introduced through inlet port 18 is forced toward an outlet port 19 through the rotary drum 6 during which the liquid absorbent is regenerated.

As shown in FIG. 1, a heater 20 for heating the liquid absorbent is disposed in the bottom of the regeneration tower 2 whereas a cooler 21 is disposed in the bottom of the absorbing tower 1. Blowers 22 and 23 are used to supply air to inlets 16 and 18.

The dehumidifier of this invention constructed as above described operates as follows. At first a suitable amount of liquid absorbent such as a solution of lithium chloride and the like is charged in the bottom portion of the absorption tower and then the electric motor 14 is started. As the lower portion of the rotary wheel 5 rotates in the liquid absorbent, the scrap material contained in the rotary wheel will be impregnated with the liquid absorbent. Wet air is brought into contact with the impregnated scrap material while it is forced to pass through the absorption tower 1 and exhausted through the outlet opening 17 by the action of a blower 22 at the intake opening 16. Thus, the moisture contained in the air is absorbed by the liquid absorbent dependent upon the difference between the vapor pressure of the liquid absorbent and the partial vapor pressure of the air, and the dried air is exhausted through the outlet opening 17.

As the operation is continued the quantity of the liquid absorbent increases gradually by absorbing the moisture in the air so that the concentration and hence the ability of the absorbent will be decreased. Accordingly it becomes necessary to transfer it to the regeneration tower in order to concentrate it. Diluted liquid absorbent is fed to the regeneration tower by the cooperation of the buckets 10 mounted on the rotary wheel 5 and the chute 11a. The diluted liquid absorbent fed into the regeneration tower is heated by the immersion heater 20. The scrap material contained in the rotary drum 6, which is of the identical construction as the rotary drum 5 except for the buckets, is impregnated with the heated liquid absorbent and will be passed by the hot regenerating air forced into the regeneration tower by a blower 23 and heated by the heater 18a. Since the vapor pressure of the liquid absorbent is higher than the partial vapor pressure of the regenerating air, the air absorbs the moisture contained in the liquid and then will be discharged out of the tower. The latent heat necessary for evaporating the moisture is supplied by the scrap material in the rotor in accordance with the principles of a continuous rotary heat exchanger. Thus the diluted liquid is concentrated and returns back to the absorption tower through the overflow tube 13. The above-mentioned cycle of operation is repeated to continuously dehumidify and dry the air in a room.

As shown in FIG. 1, in the dehumidifier of this invention, the levels of the liquid absorbent in the absorption and regeneration towers are different so that the liquid in the regeneration tower can naturally return back into the absorption tower.

When the load of the absorption tower is increased owing to high humidity, the level of the absorbent liquid therein will be elevated and result in the increase in the action of the buckets so that the liquid temperature in the regeneration tower will be lowered. Thus, in order to prevent the liquid temperature in the regeneration tower from becoming too low it is necessary to increase the heating capacity of the heater 20 by an automatic regulator. The air introduced through the inlet 18 is heated by the heater 18a so that it comes in contact with the heated liquid when it is forced through the scrap material contained in rotary drum 6. Since the vapor pressure of the liquid is higher than the partial vapor pressure of air the moisture contained in the liquid absorbent will be evaporated into the heated air and exhausted through the outlet port 19, thus concentrating the liquid absorbent.

The regenerated liquid absorbent is returned to the absorbent tower 1 through overflow pipe 13. In this manner the concentration of the liquid absorbent contained in the absorbent tower 1 will be maintained so as to provide the desired absorbing power.

Figure 2:
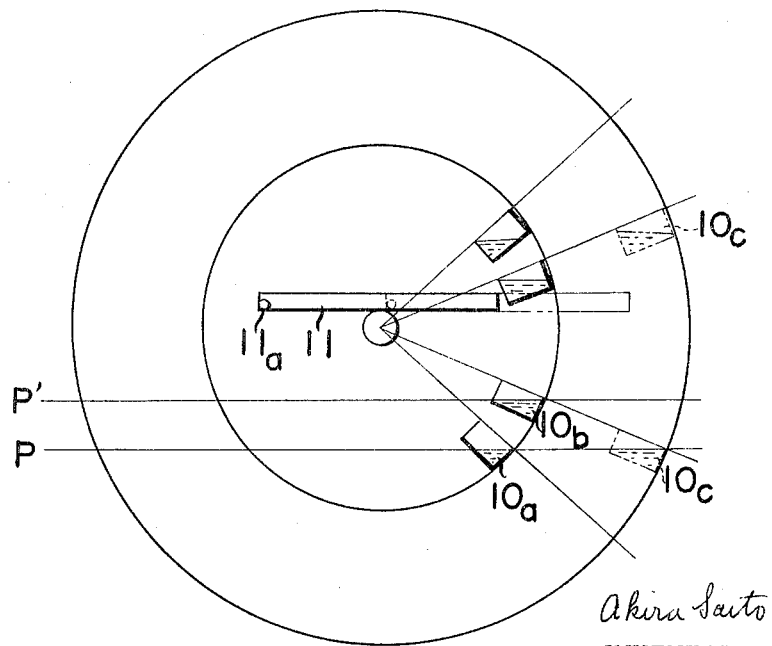
FIG. 2 is a diagram for explaining the change in the action of the bucket when the liquid level changes.

The liquid level in the absorbent tower 1 varies, depending upon the quantity of moisture absorbed by the liquid. As shown in FIG. 2 when the liquid level rises, the absorption quantity in the buckets will be increased and increase the liquid quantity transferred to the regeneration tower 2. On the other hand when the liquid level lowers, the load on the regeneration tower 2 will be decreased. As the absorption quantity in the buckets is increased the liquid temperature in the regeneration tower 2 is decreased so that it is advantageous to increase the heating action of heater 20 by means of a suitable automatic regulator as already mentioned. Conversely, when the load on the absorbing side decreases the absorption quantity of the buckets is decreased so that it is able to maintain the temperature of the liquid in the regenerator at the desired value without the aid of the heater 20. Consequently, any well known thermostat may be used for the automatic regulation of heater 20.

Thus, the required absorbing power is obtained from the difference between the vapor pressure of the liquid absorbent and the partial vapor pressure of the air to be dehumidified and the regenerating power or reverse absorbing power is derived from heated air and the liquid absorbent which are influenced by temperatures. Moreover, as the liquid absorbent is supplied to the regeneration tower by means of rotating buckets and a trough there is no problem of corrosion and crystallization. Furthermore, the heat exchange effected between wet scrap material and air contacting the scrap material is sufficiently cooled or heated by being immersed in the liquid absorbent contained in towers 1 and 2. This two staged heat exchange system has higher efficiency as compared with conventional systems utilizing sub-cooling for the liquid absorbent or cooling coils for contacting the liquid absorbent with air on the surface of cooling coils. Utilization of buckets is advantageous in that the quantity of the liquid fed to the regenerator in response to the load variation of the absorbing device is automatically controlled.

Although the invention has been described in detail above, it is not intended that the invention should be limited by the description but only in accordance with the spirit and scope of the appended claims.

What is claimed is:

1. A dehumidifier of air comprising an absorption and a regenerative tower disposed in side by side relationship and having common wall tanks formed in the bottom of each tower and adapted to contain a liquid absorbent, first and second rotary open ended drums mounted on a horizontal shaft in said absorption and regenerative towers respectively adapted to rotate in a vertical plane and so arranged that the lower portions of said drums extend into said tanks so as to contact liquid therein, the interior of each of said drums being filled with porous packing material, means to rotate said drums, a plurality of buckets attached to the drum in the absorption tower on the side of the drum adjacent said common wall and radially distant from said shaft, a trough positioned in said absorption tower between the partition wall and said first drum above said shaft and radially closer to said shaft than said buckets, a pipe extending from said trough through said partition and into the tank in said regeneration tower, whereby when said first drum is rotated, the packing in said first drum is wetted by said liquid and said buckets lift liquid from said absorption tank and empty said liquid into said trough for discharge through said pipe into said regenerative tower tank, overflow pipe means communicating with each of said tanks, heating means in said regenerative tower and means to circulate air to be dehumidified through each of said towers and each of said drums.

2. The dehumidifier according to the claim 1 wherein said buckets are adjustable in the radial direction.

3. A dehumidifier for air as claimed in claim 1, said towers being upright towers each including inlet and outlet ports at the upper part thereof disposed above the level of the liquid to be held therein, and cooling and heating means respectively disposed in the lower parts of said absorption and regeneration towers.

4. A dehumidifier for air as claimed in claim 3 wherein the buckets are adjustable in the radial direction.

References Cited by the Examiner

UNITED STATES PATENTS

| | | | |
|---|---|---|---|
| 1,919,781 | 7/1933 | Forrest et al. | 55—85 X |
| 2,147,248 | 2/1939 | Fleisher | 55—85 X |
| 2,221,787 | 11/1940 | Downs et al. | 55—85 X |
| 2,343,820 | 3/1944 | Thornton | 261—92 X |

FOREIGN PATENTS 565,877   8/1957   Italy.

HARRY B. THORNTON, *Primary Examiner.*

D. K. DENENBERG, *Assistant Examiner.*